United States Patent
Zhen et al.

(10) Patent No.: US 8,351,339 B2
(45) Date of Patent: Jan. 8, 2013

(54) METHOD FOR BLUETOOTH ON-DEMAND ROUTING AND NETWORK FORMATION, AND COMMUNICATION METHOD IN BLUETOOTH GROUP AD HOC NETWORK

(75) Inventors: Bin Zhen, Suwon (KR); Myung-jong Lee, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1633 days.

(21) Appl. No.: 10/409,164

(22) Filed: Apr. 9, 2003

(65) Prior Publication Data
US 2003/0202477 A1 Oct. 30, 2003

(30) Foreign Application Priority Data

Apr. 25, 2002 (KR) .............................. 2002-22824
Jun. 20, 2002 (KR) .............................. 2002-34673
Nov. 21, 2002 (KR) ..................... 10-2002-0072841

(51) Int. Cl.
*H04L 1/00* (2006.01)

(52) U.S. Cl. ......... 370/248; 370/254; 370/255; 370/338

(58) Field of Classification Search .................. 370/255, 370/351, 248, 254, 338, 401, 449, 465
See application file for complete search history.

(56) References Cited

U.S. PATENT DOCUMENTS

| | | | | |
|---|---|---|---|---|
| 6,535,498 | B1 * | 3/2003 | Larsson et al. | 370/338 |
| 6,683,886 | B1 * | 1/2004 | Eftimakis et al. | 370/458 |
| 6,691,173 | B2 * | 2/2004 | Morris et al. | 709/249 |
| 6,704,293 | B1 * | 3/2004 | Larsson et al. | 370/255 |
| 6,745,038 | B2 * | 6/2004 | Callaway et al. | 455/456.1 |
| 6,751,200 | B1 * | 6/2004 | Larsson et al. | 370/255 |
| 6,788,702 | B1 * | 9/2004 | Garcia-Luna-Aceves et al. | 370/458 |

(Continued)

FOREIGN PATENT DOCUMENTS

WO WO 01/41377 A1 6/2001

(Continued)

OTHER PUBLICATIONS

Johansson et al., "Short Range Radio Based Ad-hoc Networking: Performance and Properties", IEEE International Conference on Communications, Jun. 1999, vol. 3, pp. 1414-1420.*

(Continued)

*Primary Examiner* — Robert Wilson
*Assistant Examiner* — Brian O Connor
(74) *Attorney, Agent, or Firm* — Sughrue Mion, PLLC (57) ABSTRACT

A method for Bluetooth on-demand routing, and network formation, and a communication method of a Bluetooth group ad hoc network. With respect to a Bluetooth network system that has a source node, a destination node and a plurality of independent nodes, the method includes the forward and the backward path set-up steps. In the forward path set-up step, the source node sends out a route request message, thus setting up multi forward paths towards the source node and the destination node. In the backward path set-up step, the destination node in receipt of the route request message sends out a route reply message to the source node through one of the set forward paths, thus setting up a backward path. Through the set backward path, a route is formed as the most suitable path between the source node and the destination node to save battery power and provide broader bandwidth.

17 Claims, 7 Drawing Sheets

U.S. PATENT DOCUMENTS

| | | | | |
|---|---|---|---|---|
| 6,791,997 | B2 * | 9/2004 | Beyer et al. | 370/447 |
| 6,795,421 | B1 * | 9/2004 | Heinonen et al. | 370/338 |
| 6,847,625 | B2 * | 1/2005 | Heinonen et al. | 370/338 |
| 6,876,643 | B1 * | 4/2005 | Aggarwal et al. | 370/338 |
| 6,901,057 | B2 * | 5/2005 | Rune et al. | 370/310 |
| 6,954,438 | B2 * | 10/2005 | Morley et al. | 370/278 |
| 6,968,153 | B1 * | 11/2005 | Heinonen et al. | 455/11.1 |
| 7,058,050 | B2 * | 6/2006 | Johansson et al. | 370/386 |
| 7,161,923 | B2 * | 1/2007 | Young | 370/338 |
| 7,215,976 | B2 * | 5/2007 | Brideglall | 455/552.1 |
| 2002/0044549 | A1 | 4/2002 | Johansson et al. | |
| 2002/0061009 | A1 * | 5/2002 | Sorensen | 370/351 |
| 2003/0104848 | A1 * | 6/2003 | Brideglall | 455/574 |
| 2004/0100929 | A1 * | 5/2004 | Garcia-Luna-Aceves | 370/338 |

FOREIGN PATENT DOCUMENTS

WO    WO 01/41378 A1    6/2001

OTHER PUBLICATIONS

Morrow, "Connecting With a Bluetooth Piconet", Microwaves & RF, Winter 2000, pp. 7-14.*

Lee et al., "Model and Performance Evaluation of a Piconet for Point-to-Multipoint Communications in Bluetooth", IEEE Vehicular Technology Conference 2001, May 6-9, 2001, p. 1144-1148.*

Ramachandran et al., "Clustering Algorithms for Wireless Ad Hoc Networks", Proceedings of the 4th International workshop on Discrete algorithms and methods for mobile computing and communications, Dec. 31, 2000, p. 54-63.*

Young Liu, et al., "A Bluetooth Scatternet-Route Structure for Multihop Ad Hoc Networks", IEEE Journal on Selected Areas in Communications, vol. 21, No. 2, Feb. 2003, pp. 229-239, XP002243904.

Per Johansson, et al., "Bluetooth: An Enabler for Personal Area Networking", IEEE Network, vol. 15, Sep. 2001, XP002243905.

David B. Johnson, et al., "The Dynamic Source Routing Protocol for Mobile Ad Hoc Networks (DSR)", IETF Draft Manet Working Group, Feb. 21, 2002, XP002243906.

Charles E. Perkins, et al. "Ad Hoc on Demand Distance Vector (AODV) Routing draft-ietf-manet-aodv-10.Txt", IETF Draft Mobile Ad Hoc Networking Working Group (Manet), Jan. 19, 2002, XP002243907.

* cited by examiner

BLUE-STAR ISLAND
(a)

BLUE-STAR ISLAND
(b)

● ○ SLAVE

● MASTER

○ JOINT NODE

METHOD FOR BLUETOOTH ON-DEMAND ROUTING AND NETWORK FORMATION, AND COMMUNICATION METHOD IN BLUETOOTH GROUP AD HOC NETWORK

BACKGROUND OF THE INVENTION

1. Field of the Invention

The present invention relates to a method for network formation and communication in a Bluetooth group, and more particularly, to a method for Bluetooth on-demand routing and networking formation and a communication method in Bluetooth group ad hoc network capable of minimizing the number of piconets. This present application is based on Korean Patent Application Nos. 2002-22824, 2002-34673, and 2002-72841, filed Apr. 25, 2002, Jun. 20, 2002, and Nov. 21, 2002, respectively, which are incorporated herein by reference.

2. Description of the Prior Art

First, a conventional network formation algorithm for a Bluetooth network will be described.

Salonidis has suggested a Bluetooth topology construction protocol (BTCP) for scatternet formation. According to the BTCP, there are three stages. In the first stage, a coordinator possessing information about all nodes is selected using a state-changing technique for symmetric link formation. In the second stage, the selected coordinator decides the functions of the respective nodes. Then the practical connection is made in the third stage. The BTCP is based on the condition that all the nodes are within radio range.

Based on the above condition, and also based on all the defined nodes, Aggarwal et al. have grouped the network into independent piconet clusters. When a so-called "super-master" that has the information about all the nodes is selected, the re-construction of, and connection between the piconets is performed under the monitor, or control of this super leader.

Law et al. have suggested a one-step scatternet formation algorithm that has O(log n) times of complexity and O(n) message complexity. According to this, all the nodes are separated to have only one leader. The constituent is a group of nodes that are connected to one another. The leader enters "seek and scan" state, and then selectively performs processes such as "connection", "merge", "mitigate" or moving of devices. The drawback of Law et al. lies in the limitation that requires all the nodes to be within communication range.

In the blue-tree algorithm, a node needs to have information as to whether it is a root node or not, and information about one-hop peripherals thereof.

Tan et al. simplified packet routing and scheduling by providing routes and loop free paths, respectively. In the tree style structure, however, due to the fact that the joint node serving as master in one piconet would serve as slave in the other, two piconets tend to be closely related to each other.

Also, all the above algorithms focus the formation of scatternet on an individual operation in the data link layer, not taking actual traffic conditions and traffic requests into account. Problematically enough, "active" state has to be resumed periodically, during, or after, the initial scatternet formation even when there is little traffic, to make sure that the point-to-point link is connected in the entire scatternet at the level of the physical link.

In other words, power, which is a very essential factor of wireless communication devices, is unnecessarily consumed to maintain the links. Addressing such problems, Raman et al. suggested a theory on layer optimization of scatternet link formation with on-demand routing. However, more detailed analysis and realization thereof have yet to come.

Bhagwat and Segall suggested a routing vector method that routes the packet traffic in the scatternet. Liu Y used network formation using newly defined LMP command language. But as found in the simulation test, traffic waiting time is considerably prolonged due to many inquiries in Bluetooth.

SUMMARY OF THE INVENTION

Accordingly, it is a first object of the present invention to provide a method for on-demand routing and network forming, by which a route is formed only when a receiver of the Bluetooth ad-hoc network system desires so.

It is a second object of the present invention to provide a communication method for the Bluetooth group ad-hoc network which is capable of minimizing the number of piconets while maintaining the network formation and route independently.

The first object is accomplished by a method for routing and a network formation of a network system having a source node, a destination node, and a plurality of independent nodes, the method according to the present invention including the steps of setting multi forward paths from the source node towards the destination node in which the source node sends out a route request message, and setting a backward path in which the destination node in receipt of the route request message sends out a route reply message to the source node along one of the multi forward paths as set, wherein a route is formed as the most suitable path between the source node and the destination node through the set backward path.

The forward path set-up step preferably includes the steps of broadcasting a route request message when the source node requires a route towards the destination node and there are one or more routes available, and transmitting the route request message in which one or more intermediate nodes that are hopped next to the source node receive the broadcasted route request message and transmit the route request message to the next hopping nodes until the route request message reaches the destination node.

With a connection being set-up between the source node and the destination node, the source node becomes a master and the neighboring intermediate node becomes a salve, such that the route request message is transmitted from the master to the slave.

All the intermediate nodes along the forward path are master-slave joint nodes.

The route request message is a routing trigger that initiates an Inquiry operation in the source node to find and connect the neighboring nodes.

Meanwhile, the backward path set-up step includes the steps of transmitting a route reply message to the source node in which the destination node in receipt of the route request message sends out the route reply message to the source node along one of the formed forward paths, and transmitting the route reply message in which intermediate nodes that are hopped from the destination node towards the source node receive the route reply message, and transmit the route reply message to the next hopping nodes until the route reply message reaches the source node.

The route reply message is a routing trigger that initiates a master-slave switching to interleave a slave-slave joint node between the master nodes.

The master-slave switching is performed between a node spaced from the destination node by an even number and the next hopping node.

In order to accomplish the second object, in a communication method of a Bluetooth group ad hoc network that comprises a plurality of adjacent wireless communication devices, the communication method according to the present invention includes the steps of forming a network that comprises a plurality of piconets comprising a slave node operating as a slave in only one piconet, a master node operating as a master in only one piconet, a slave-slave joint node operating as a slave in two piconets, and a master-slave joint node operating as a slave in one piconet while operating as a master in another piconet, and at least two piconets are connected by the slave-slave joint node; and, with a reception of the routing trigger at the joint node, the joint node bridging the piconets belonging to the formed network.

The slave node performs an Inquiry Scan at a regular basis, to be found by a new master, and with a reception of a routing trigger signal, performs an Inquiry to find a nearby network.

The slave node becomes a joint node when the slave node is found by a new master and thus a new link is added.

The master node performs an Inquiry at a regular basis to find a free node positioned in a communicable range, performs the Inquiry Scan at a regular basis to be found by another master node when both master nodes are in a radio range, and switches to a slave node upon being found by another master node.

The routing trigger is a signal generated from a routing protocol or a management entity, and at least one of route request (RREQ), route reply (RREP), and route error (RERR).

A data structure of the nodes belonging to a same piconet, or to a same network, is recorded as a table, and routing is performed based on the table.

The table is updated when a new node, or a new network is found, and with the link being lost, deletes corresponding node from the table.

The table records at least a master node Bluetooth Device Address (BD-ADDR), a slave node Bluetooth Device Address (BD-ADDR), a connection lifetime, a piconet, or a network lifetime, and a Bluetooth Device Address (BD-ADDR) of a slave-slave joint node.

BRIEF DESCRIPTION OF THE DRAWINGS

The above objects and other features of the present invention will become more apparent by describing in detail a preferred embodiment thereof with reference to the attached drawings, in which.

DETAILED DESCRIPTION OF THE PREFERRED EMBODIMENT

Hereinafter, the present invention will be described in detail with reference to the accompanying drawings.

IEEE 802.11b explains that any nodes can participate in the communication if they are located within a wireless communication range because synchronization is made frame by frame and there is no pre-process required to set up the links. In other words, the network is always available for use. In the case of multi-hopping, the networking is performed by a routing algorithm. There is no sub-layer protocol stack of 802.11 for network formation system.

However, the Bluetooth node requires formation of piconets prior to packet transmission. Briefly put, while the routing protocol-defined profile focuses on the source and destination after the establishment of a network, the network formation focuses on providing and maintaining the "better" route based on the data link layer between the source and destination as well as the route.

A plurality of paths may exist between two nodes, and, to select the path and route among them is the main purpose of the routing algorithm-defined profile. Here, a 'path' denotes all the network connections between two nodes, while a 'route' denotes one path selected by the routing protocol for packet transmission. Of course, the routing algorithm-defined profiles can help in the establishment of a network. Well known for this purpose is the "route discovery" of the on-demand MANET routing algorithm. Multicasting and QoS (Quality of Service) guarantee are also made on the routing protocol. Meanwhile, it is the purpose of network formation to perform better packet transmission at the level of the Bluetooth physical layer and data link by re-arranging the routes selected for all nodes. The emphasis is on the "better quality" network. It is therefore very important to determine when, and which node becomes the master or the slave, or which type of joint node exists on the route between the source and the destination.

Figure 1:
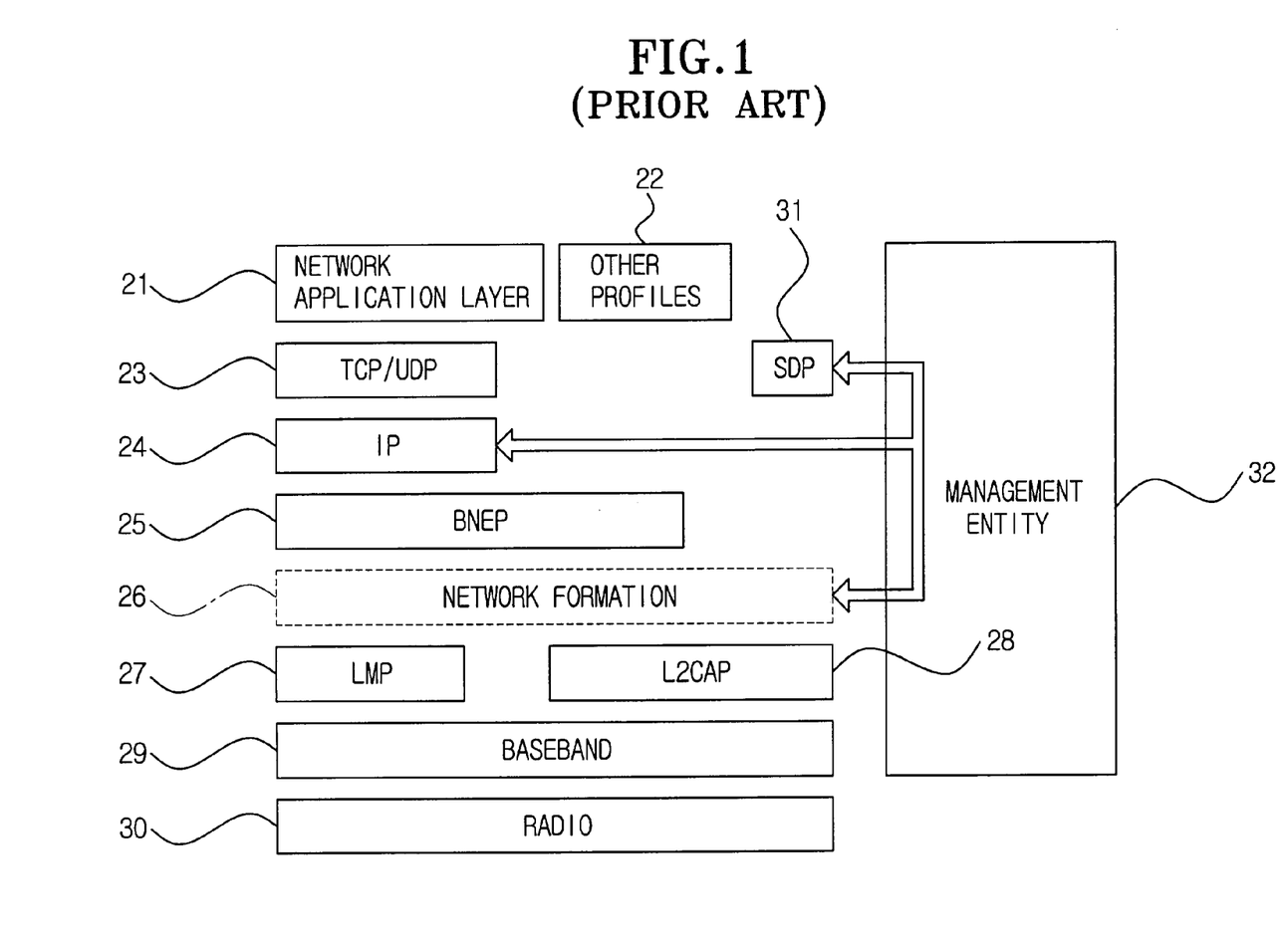
FIG. 1 is a view showing a protocol stack used in a Bluetooth group ad-hoc network.

FIG. 1 illustrates a protocol stack that is used in the Bluetooth group ad-hoc network.

Bluetooth SIG defines the Bluetooth network encapsulation protocol (BNEP) for providing the networking ability of the Bluetooth node and applications.

A network formation 26 is positioned between L2CAP (logical link control & adaptation protocol) 28 and BNEP 25. The main purpose of the network formation 26 is to realize faster, and better quality Bluetooth piconet and scatternet from the viewpoint of the data link layer and the physical layer. The network formation 26 is communicable with the routing protocol.

Referring to FIG. 1, it is assumed that the routing protocols are located in the IP layer 24. This hides the Bluetooth being executed in the higher layer of the routing protocol, or the like.

Generally, the purpose of the routing protocol is to find out the best route within the existing network topology. Under the guidance of the routing protocol, the network formation 26 determines which node becomes the master and which node becomes the slave, and which type the joint node is.

As the network is formed using the minimum number of piconets possible in the given network diameter, inter-piconet interference and packet scheduling with the adjacent piconets decreases. As a result, better maintenance of the network becomes possible.

Albeit different from each other in operation, the routing protocol and the network formation are closely associated with each other based on the Bluetooth group ad-hoc network.

Let us define "L3 trigger" as a mechanism provided for the network formation to communicate with the routing protocol and other profiles at the upper layers. More detailed description will be made about the "L3 trigger" in the later part of the description.

The arrows of FIG. 1 denote a signaling pipe that connects the profile, the routing protocol and management entity 32 with the network formation 26. The network formation 26 may exchange message or commands with the protocols or profiles of upper layers.

The network formation 26 provides utility under the control of the defined profile or the routing protocol, so as to provide a better quality network and furthermore, the multi-hopping network formation. The number of piconets can decrease as there are smaller diameter, less inter-packet collision, smaller overlapping with adjacent piconets, and more inter-piconet scheduling. It is also necessary that the network be maintained with less cost.

Figure 2:
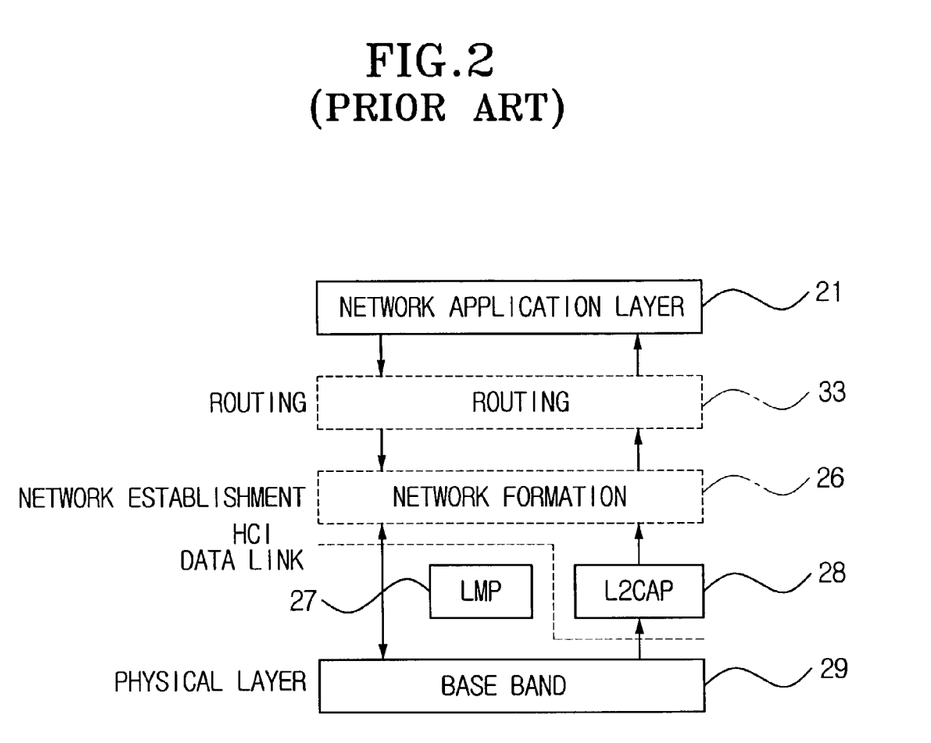
FIG. 2 is a view schematically showing a protocol stack of a Bluetooth node in an ad-hoc network.

FIG. 2 schematically illustrates the protocol stack of a Bluetooth node in the ad-hoc network.

FIG. 2 shows how the routing protocol 33 and the network formation 26 cooperates with each other under the Bluetooth group ad-hoc network environment. There is a signaling pipe existing among the networking application 21, routing protocol 33 and network formation protocol 26. The network application layer 21 initializes the communication between two nodes. If the routing protocol 33 is informed of a route to the destination, data packets are directly transmitted to the destination. If the routing protocol 33 is not informed of the route to the destination, the routing protocol 33 inquires the network formation layer 26 positioned therebelow about the available path to the destination. If there is an available path in the network formation protocol 26 between the source and the destination, all the available paths are informed of the routing protocol. Since the different strategies and factors apply to the routing protocol 33 and the network formation protocol 26, respectively, network topology stored therein may vary.

The network formation protocol 26 needs to be informed of the network topology more than the routing protocol 33 does. The routing protocol 33 selects one of the routes. If there is no path available in the network formation protocol 26 to the destination, the routing protocol 33 sets a connection to the nearby node by starting the "inquiry/page" process through the HCI request. Then, the network topology information, or the request for destination is exchanged between the network formation protocols of the two neighboring nodes. This process repeats until the destination is found, or needs to be stopped due to other conditions.

Terminology of the blue-star network is as follows:

Free node: node without a connection with other nodes.

Slave node: node serving as a slave member in only one piconet.

Master node: node serving as a master member in only one piconet.

Joint node: node serving as a member in at least two piconets. With the maximum number of piconets to which one node can join being M, if the node joins (M+1)th piconet, one link out of M piconets needs to be down. There are two joint nodes in the scatternet: S-joint node and M-S joint node.

S-S joint node: joint node serving as a slave in both piconets.

M-S joint node: joint node serving as a slave in one piconet and as a master in another piconet.

Intermediate node: node agreed to transmit destined packets to another node.

Forward path: path determined to transmit data packet from one node that starts route discovery toward a desired destination.

Reverse (backward) path: path determined to transmit RREP packet from an intermediate node that has a route to a destination node, or the destination.

Routing trigger: notification from on-demand routing protocol informing that a certain event is occurring, or is to occur. The notification may include parameter information, and initiated in the Bluetooth base band. The routing protocol may be located at the IP layer, management entity or Bluetooth data link layer.

Inquiry state: with a response from a node to an inquiry train, page is performed to form a link between two nodes.

Dormant state: low-power consumption state of a Bluetooth node to save battery power in the connection and standby states, such as hold mode, sniff mode and park mode.

Blue-star island: piconet or scatternet having S-S joint node. The 'star' of the blue-star represents a star-shaped network topology.

Master of the piconet is a center. There are two centers in the scatternet.

Figure 3:
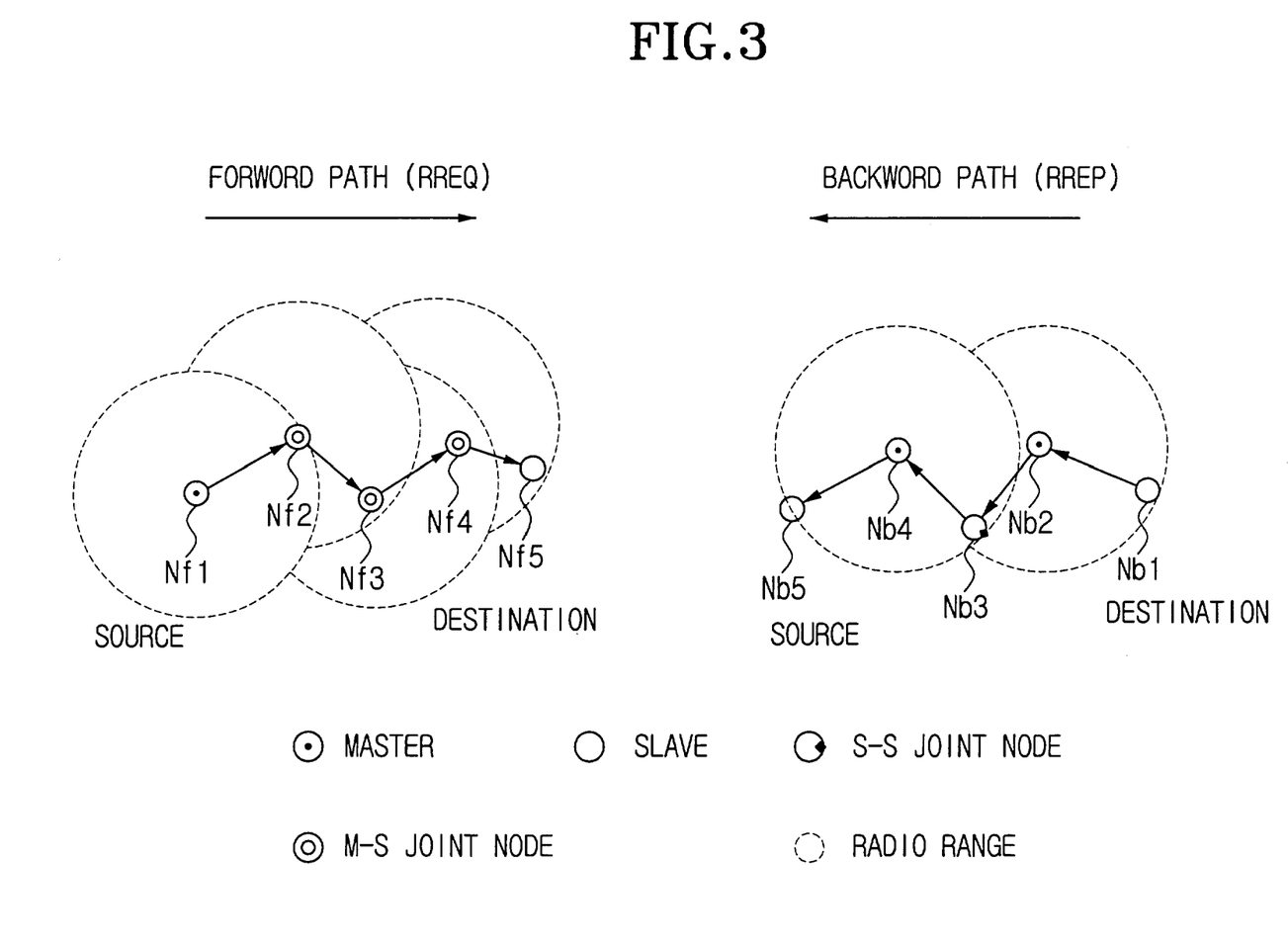
FIG. 3 is a view illustrating a function of a node during forward and backward paths in the Bluetooth on-demand routing and networking formation according to the present invention.

FIG. 3 illustrates the function of the node in forward and backward paths of the on-demand routing and network formation according to the present invention.

Referring to FIG. 3, each node can serve four functions of a free node, a master node, a slave node, and a joint node. In an initial stage, all nodes are free nodes. From a viewpoint of the route, i.e., in the direction of the packet forward route, the node is called as a source node, an intermediate node and a destination node.

Any node in any state should enter the Inquiry Scan at a regular basis so as to be found irrespective of their states.

On-demand network formation is made only upon request by the source node. Prior to this, all the nodes are independent. When the source node wants to send a packet to certain destination nodes but there is no available route, the routing algorithm starts finding paths to the destinations.

The path finding process is ended when a route to the destination nodes is found, or all the possible path exchanges are searched.

The source node broadcasts the RREQ message. The RREQ message in the routing protocol triggers inquiry in the base band of the source node to find and connect the neighboring nodes.

In the routing protocol, a route to the destination is required, and the RREQ message is broadcasted when there is no route available. The node sends out the RREQ message to the connected node.

For the node, the RREQ message is the "routing trigger" that initiates the inquiry in the base band except for the following four cases.

1. When N (N≦7) of active slaves are pre-connected with respect to the master node
2. When M of piconets are connected by the joint node
3. When the time-to-leave (TTL) field of the RREQ message is terminated in the routing protocol, and
4. When a copy of the RREQ message is received.

In the event that a new node is found by the inquiry process, the node becomes the master, while the new node becomes the slave of a newly formed piconet. The RREQ message is transmitted to the new node after formation of the BNEP connection. If the new node joins the (M+1)th piconet, the new node needs to disconnect from one of the existing connections.

The forward path possesses a lifetime attribute. This means that the forward path must be confirmed within a limited time period. More specifically, there is a park lifetime and a disconnect lifetime. While the path lifetime belongs to a connection attribute in the network, the route lifetime belongs to an attribute of a routing table in the routing protocol.

Along the forward path, all the intermediate nodes are master-slave joint nodes.

Hereinbelow, the backward path will be described with reference to FIG. 3.

In the routing protocol, with the reception of the RREQ message with respect to the destination, the node that has enough routes to satisfy the request and is itself a destination generates a RREP message. Along the forward path, all the intermediate nodes are M-S joint nodes.

RREP message is a routing trigger that initiates stopping of inquiry in process, and re-forming of the network along the backward path and the subsequent reduction of existing piconets.

Meanwhile, the RREP packet is a routing trigger that initiates a master-slave switch and subsequent interleaving of an S-S joint node between the master nodes.

The main principle of the network reformation is about the interleaving of available S-S joint nodes between the master nodes. The interleaving minimizes the number of piconets.

The network re-formation segment is interposed between the start node and the end node. The end node is where the RREP message is generated. The start node is where the RREQ message is first transmitted in the air when operating as a master. Also, the start node is a next hop node where the RREQ message is first transmitted in the air when operating as a slave.

The start node operates as a master, and the end node operates as a slave.

The networking application profile may have a high priority to determine roles of the nodes. Master-slave switch only occurs between even-number spaced nodes and the next hop nodes.

The route table on another path may be a node that TTL has not elapsed, or the function of the node is unchangeable to minimize influences of the existing networks. Function of the node is also unchangeable for the nodes that wish to have a fixed function in the piconet.

Figure 4:
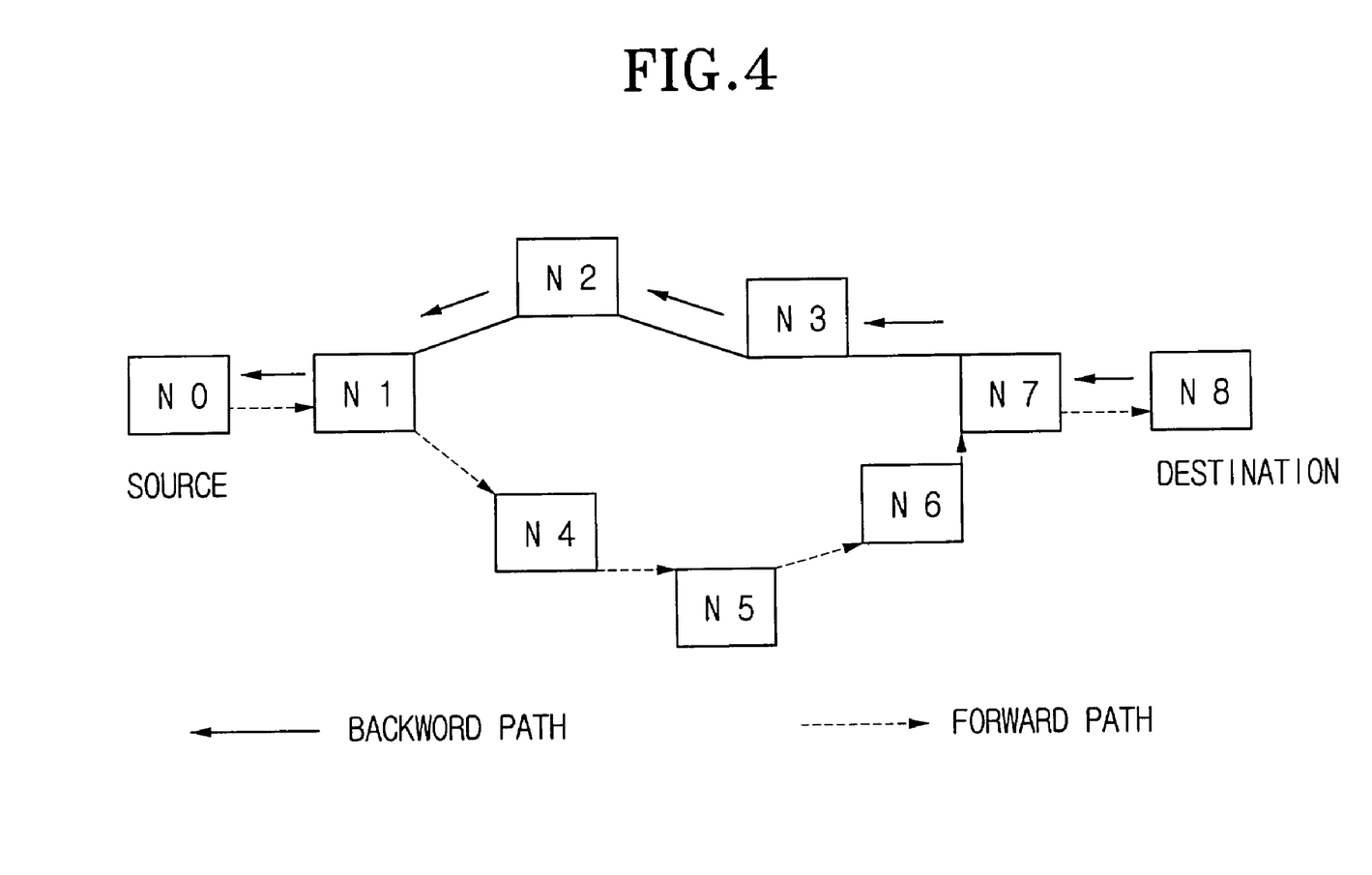
FIG. 4 is a view illustrating a backward path among multi-forward paths in the Bluetooth on-demand routing and network formation according to the present invention.

FIG. 4 illustrates the routing of backward path among the multi-forward paths according to the on-demand routing and network formation according to the present invention.

As shown in FIG. 4, transmission is made from the source node N0 to the destination node N8 along two paths. However, the RREP message is not advanced along the node N4 to node N6. This is because the routing protocol selects a single route among them. As the park lifetime elapses, links on the unselected forward paths are parked and return AM-ADDR to save battery power. As the disconnect lifetime elapses, links on the forward paths break to save battery power.

Next, route error and ending the route will be described.

In the routing protocol, if the link breaks or the route ends, the route error (RERR) message is generated and broadcasted. The RERR message is a "routing trigger" that initiates parking of the remaining links. In the routing protocol, when the route to the destination ends, connections along the path are parked to save battery power. Slave nodes need to wake up periodically to monitor the links. When the route to the destination is deleted from the route table, the connection along the path is severed.

The blue-star islands network formation is a two-step protocol. The first step is an automatic formation among the free nodes. The blue-star islands network formation may be a piconet in which joint node operates as a slave in both piconets, or be a scatternet. With the first supply of power, the nodes function as free nodes according to default function.

Then the nodes switch in turn, to the Inquiry, Inquiry Scan, and Dormant states. The nodes are independent, and thus ignorant to each other. Each node may access as a slave to become a slave node, and access as a master to become a master node. The slave nodes may enter the Inquiry Scan state to be found by other piconets, and thus, the blue-star islands can be formed. The master node enters the Inquiry state to find more slaves. The master node also enters the Inquiry Scan state to be found by other masters, thus preventing two master nodes from entering into radio range. Since all the Bluetooth nodes are self-organized, it is also possible to form individual multi blue-star islands.

Figure 5:
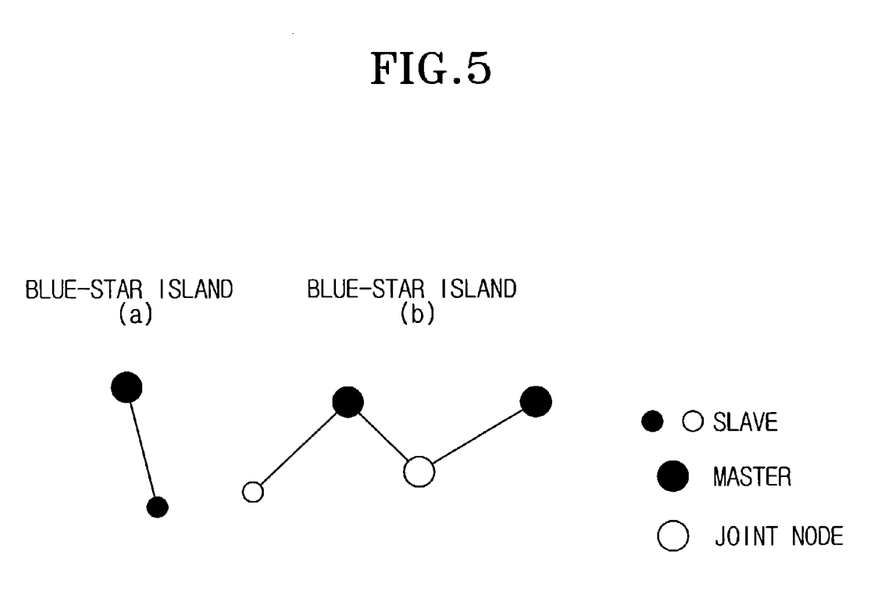
FIG. 5 is a view showing an example where the two neighboring blue-star islands are disconnected from each other.

FIG. 5 shows the two neighboring blue-star islands (a) and (b) in a non-connection state.

The second step of the blue-star islands network formation is to bridge the blue-star islands by the initiation of a L3 trigger. The L3 trigger is a short notification transmitted from the routing protocol, profile or the management entity. For example, the L3 trigger may be a message such as Route REQuest or "HELLO" of the routing algorithm. Commands from the profiles such as "Service Discovery" also belong to the L3 trigger. After the L3 trigger, all the edge nodes and slave nodes perform Inquiry state to check whether there is another slave node in the radio range. When the new blue-star islands are found, a new piconet is formed. In this case, joint node would be M-S joint node.

Figure 6:
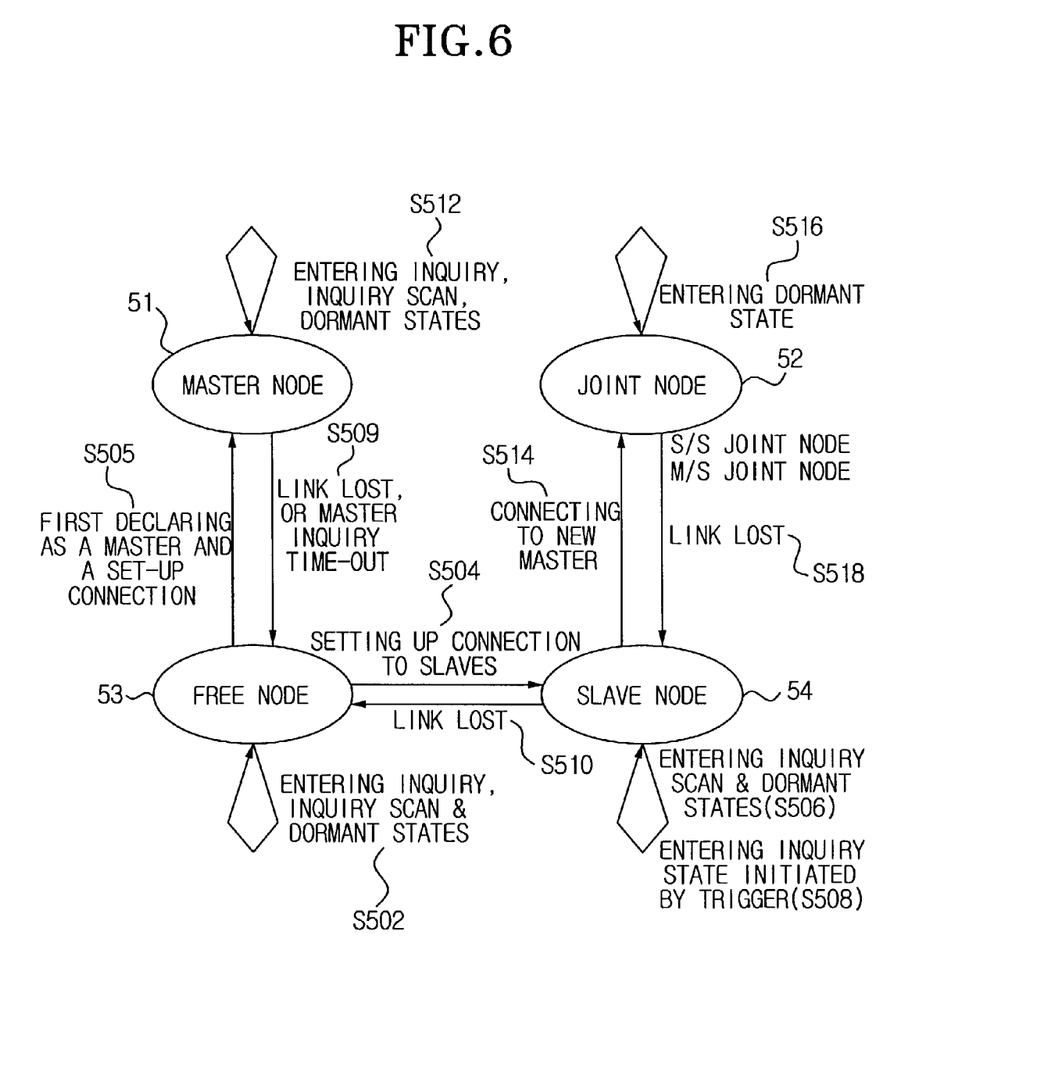
FIG. 6 is a view of signal flow, illustrating a function of node and function switching thereof in the blue-star network formation.
Figure 7:
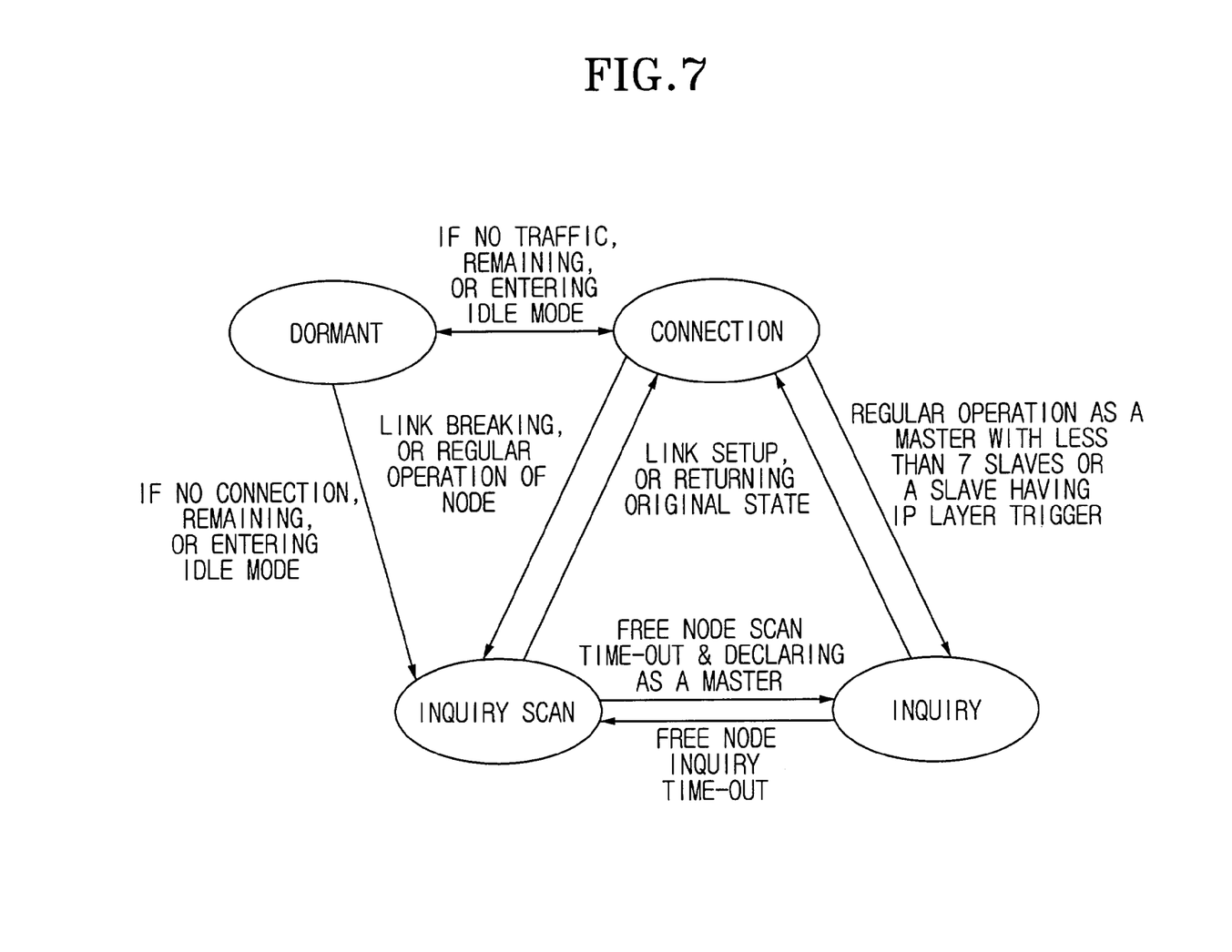
FIG. 7 is a view illustrating the nodes in respective states.

FIG. 6 is a view illustrating the role switch of nodes in the blue-star network formation, and FIG. 7 shows the nodes in respective states.

In FIG. 6, the free node 53 is the one which existed before the network formation, and defined as the node that has no connection with the other nodes.

The free node 53 is a default node after the power-on. The free node 53 has no connection with the other nodes, and thus connectionless. The free node 53 enters Inquiry state, Inquiry Scan state and Dormant state in operation S502. After the power-on, or after waking up from the Dormant state, the free node 53 generates a random number (Rnode) between [0, 1].

If, Rnode<R0, the node enters the Inquiry state.

If, Rnode>R0, the node enters the Inquiry Scan state.

If there is no setup of connection after the Inquiry and the Inquiry Scan, the node enters the Dormant state.

As the traffic comes, the free node 53 starts Inquiry process. R0 is a fixed threshold (Value for R0 is TBD through simulation). The free node 53 must have a higher possibility to be in the Inquiry Scan state than in the Inquiry state. The free node 53 may be a traffic source, or a destination. The free node 53 maintains its role until the initial role determination is performed.

In the role determination process, the free node 53 may be a master node, or a slave node in operations S504, S505 in accordance with the state of the link as formed. Then with the breaking of the link as a slave node or a master node, the slave node, or the master node, is switched to the free node in operations S509, S510.

The slave node is defined as a slave in only one piconet.

The slave node 54 may be a traffic packet source, or a destination. In operation S506, the slave node 54 regularly enters the Inquiry Scan state to be found by a new master so as to form a bigger blue-star island, and if there is no traffic, enters the Dormant state to save battery power.

With the reception of the L3 trigger from the upper layer, the slave node 54 enters the Inquiry state to find the nearby blue-star island in operation S508. Inquiry schedule of the slave node 54 must be arranged carefully. When all the slave nodes 54 perform Inquiry at the same time, there may be serious IP packet collision. This deteriorates Inquiry process, i.e., prolongs connection set-up and causes waste of bandwidth.

Until a link with another piconet is down, or a new link is added, the slave node 54 maintains its function. When the link is down, the slave node 54 is switched to the free node 53, thus loses the link in operation S510. When a new link is added, the slave node 54 is switched to a joint node.

Meanwhile, the master node 51 may be a packet source, a packet destination, or a traffic packet relay node. The master node 51 regularly enters the Inquiry state and the Inquiry Scan state in operation S512.

The master node 51 regularly enters the Inquiry state to find a free node within the range until N (N≦7) active slaves are found. The master node 51 also enters the Inquiry Scan state regularly. This is to enable another master node in the radio range to find the master node.

If a first master node is found by a second master node, the first master node becomes a joint node, i.e., M-S joint node, in the piconet of the second master node. Then, the first master node performs master-slave switching with one slave node, and becomes a S-S joint node.

Meanwhile, other slave nodes belonging to the first master node attempt to join with a new piconet and become joint nodes in operation S514. The slave nodes, being joined with a new piconet, cannot become free nodes.

The master node records the lifetime of the respective links and the update lifetime with respect to all the packets transmitted through the links. When the connection lifetime elapses, the connected nodes (slaves) are commanded to enter the Dormant state to be a slave resource.

The master node maintains its role until all the links are broken, or until it is found by another master. In the event that all the links are broken, the master node is switched into a free node, while, in the event that it is found by another master, the found master node breaks all the links with the slaves and switched into a slave node in a new piconet.

The joint node 52 may become a traffic packet relay node among the packet source, the packet destination and the blue-star island. The joint node may enter the Inquiry Scan state regularly so as to be found by the nearby blue-star island. With the reception of the L3 trigger from the upper layer, the joint node enters the Inquiry state and finds the nearby blue-star island.

Then after joining with the (M+1)th piconet, the joint node must break an existing active link based on the connection lifetime and the piconet lifetime. In any case, it must be assured that the joint node becomes a route bottle node. M is TBD. If there is no traffic, the joint node enters the Dormant state in operation S516 in order to save battery power.

The joint node 52 maintains its role until one link is broken. When the S-S joint node link is broken, the joint node becomes a slave node in operation S518. When the M-S joint node link is broken, the joint node becomes either a master node or a slave node depending on which node is broken.

Now, the L3 trigger will be described in greater detail.

Considering the fact that the L2 trigger is used in the IETF draft only for the L2 layer, it is named L3 trigger to report an upper layer. According to IETF, the L2 trigger is a contraction of notification (potentially including parameter information) that indicates whether certain event has been, or to be occurred from the L2 layer. In here, the L3 trigger is used to indicate the notification from the upper layer of the L2CAP.

From the routing protocol, the L3 trigger may be a RREQ type message in the on-demand protocol, and may be a "HELLO" type message in the table-driven and on-demand protocols. While the RREQ message is used to find the node labeled with IP address, the HELLO message is used to detect whether the nearby node is still available. With the reception of the RREQ message from the other nodes, the slave node, being positioned between the source node and the destination node, checks whether there is a destination within reach. This is performed by the routing protocol.

If there is a destination within reach, a RREP (route reply) message is generated in the routing protocol by the routing algorithm. Along the backward path to the source, the node sends out the RREP message.

If there is no destination within reach, the node generates a L3 trigger signal and informs all the reachable slave nodes, performing the Inquiry to obtain the nearby blue-star island according to the algorithm.

If there is no reply node to the Inquiry, the node stops the Inquiry.

If there is a reply node to the Inquiry, BNEP connection is made therebetween, and the RREQ message is sent to the node.

The process repeats until the destination is found, or id of maximum hop number is reached.

As described above, the RREQ message is relayed to the intermediate blue-star island. On the contrary, the HELLO message is used only to detect nearby nodes. There is no destination node as defined. Accordingly, the HELLO message can initiate the trigger without a relay and only in the source blue-star island.

The L3 trigger may come from the management entity, a limited profile or the Service Discovery. In this case, only an upward interface that is from the network formation to the routing protocol, exists. The Service Discovery and the management type message can be the L3 trigger.

All the nodes must keep a list of nodes inclusive of reachability in the same piconet and the same blue-star island in order to record the network topology. All the nodes can communicate through the M-S joint node. Possible node data structure is listed in Table 1. When a new node, or a blue-star island is found, the node adds records, and informs all the reachable nodes of the same. When the link is lost, the node deletes one, or a group of nodes from the record. Table 1 is the result of mapping the paths from the routing protocol to the base band. The same occurs in the routing protocol. The connection lifetime attribute is used to record the active time of the connection. All the packets of the link are renewed of their attributes. The blue-star island lifetime is used to determine which of the two masters in radio range to become a slave.

TABLE 1

| Nodes in same piconet | Nodes in same blue-star island | Nodes in different blue-star islands |
|---|---|---|
| Master node BD-ADDR | Master node BD-ADDR | Master node BD-ADDR |
| Slave node BD-ADDR | Slave node BD-ADDR | Slave node BD-ADDR |
| Connection lifetime | Connection lifetime | Connection lifetime |
| Piconet lifetime | Blue-star island lifetime | Blue-star island lifetime |
| | BD-ADDR of S-S joint node | BD-ADDR of S-S joint node |
| | | BD-ADDR of M-S joint node |

Table-driven routing protocol is driven to be combined with the network information. Node record and routing table are almost identical. In the case of on-demand routing protocol, routing table and node record are different.

With the Bluetooth on-demand routing and network formation according to the present invention, battery power can be saved, and broader bandwidth can be provided with respect to the traffic in progress. Furthermore, a better scatternet formation is enabled by the master-slave switching along the backward path.

The network formation and the routing can be maintained independently, i.e., without being overlapped with each other, and the table-driven and on-demand protocol both can cover the same type of routing protocol. Furthermore, since the joint node bridges piconets, the number of piconets can be minimized. Since the slave node only performs Inquiry Scan, both the management requirements and the battery power consumption are minimized.

Although a few preferred embodiments of the present invention has been described, it will be understood by those skilled in the art that the present invention should not be limited to the described preferred embodiments, but various changes and modifications can be made within the spirit and scope of the present invention as defined by the appended claims.

What is claimed is:

1. A method for routing and network formation of a network system having a source node, a destination node, and a plurality of independent nodes, the method comprising the steps of:
   setting multi forward paths from the source node towards the destination node to which the source node sends out a route request message;
   setting a backward path in which the destination node in receipt of the route request message sends out a route reply message to the source node along one of the set multi forward paths, wherein a route is formed as a most suitable path between the source node and the destination node by a master-slave switching through the set backward path; and
   confirming the one of the set multi-forward paths within a predetermined time period,
   wherein the master-slave switching switches a master node to a slave node,
   wherein when the one of the multi forward paths are not confirmed within the predetermined time period, links on unselected forward paths are parked,
   wherein the route request message is a routing trigger that initiates an Inquiry operation in the source node to find and connect neighboring nodes, and wherein the Inquiry operation depends upon a generated random number.

2. The method of claim 1, wherein step of setting multi forward paths comprises the steps of:
   broadcasting the route request message when the source node requires a route towards the destination node and there is at least one route available; and
   transmitting the route request message in which at least one first intermediate node that is hopped next to the source node receives the broadcasted route request message and transmits the route request message to a next hopping second intermediate node until the route request message reaches the destination node.

3. The method of claim 1, wherein, with a connection being set-up between the source node and the destination node, the source node becomes a master and a neighboring intermediate node becomes a slave, such that the route request message is transmitted from the master to the slave.

4. The method of claim 1, wherein all intermediate nodes along the forward path are master-slave joint nodes.

5. The method of claim 1, wherein the routing trigger is provided from one of a routing layer and a management entity of a Bluetooth protocol.

6. The method of claim 1, wherein the step of setting the backward path comprises the steps of:
   transmitting a route reply message to the source node in which the destination node in receipt of the route request message sends out the route reply message to the source node along one of the set multi forward paths; and
   transmitting the route reply message in which intermediate nodes that are hopped from the destination node towards the source node receive the route reply message, and transmit the route reply message to the next hopping nodes until the route reply message reaches the source node.

7. The method of claim 6, wherein the route reply message is a routing trigger that initiates the master-slave switching to interleave a slave-slave joint node between master nodes.

8. The method of claim 6, wherein a routing that performs routing in the Bluetooth protocol is independent from the network formation, and formed one of a BNEP (Bluetooth network encapsulation protocol) layer and an IP (internet protocol) layer.

9. The method of claim 7, wherein the master-slave switching is performed between a node spaced from the destination node by an even number and the next hopping node.

10. A communication method of a Bluetooth group ad hoc network that comprises a plurality of adjacent wireless communication devices, the communication method comprising the steps of:
    forming a network that comprises a plurality of piconets comprising a slave node operating as a slave in only one piconet, a master node operating as a master in only one piconet, a slave-slave joint node operating as a slave in two piconets, and a master-slave joint node operating as a slave in one piconet while operating as a master in another piconet, and at least two piconets are connected by the slave-slave joint node; and
    with a reception of a routing trigger at a joint node, the joint node bridging the piconets belonging to the formed network,
    wherein the slave node performs an Inquiry Scan at a regular basis to be found by a new master, and with a reception of the routing trigger, performs an Inquiry to find a nearby network,
    wherein the routing trigger initiates stopping of the inquiry in progress and reforming of the network along a backward path,
    wherein the routing trigger is a signal generated from one of a routing protocol and a management entity, and at least one of a route request (RREQ), route reply (RREP), and route error (RERR), and wherein the Inquiry Scan depends upon a generated random number.

11. The communication method of claim 10, wherein the slave node becomes the joint node when the slave node is found by a new master and thus a new link is added.

12. The communication method of claim 10, wherein the master node performs an Inquiry at a regular basis to find a free node positioned in a communicable range,
    performs the Inquiry Scan at a regular basis to be found by another master node when both master nodes are in a radio range, and
    switches to a slave node upon being found by the another master node.

13. The communication method of claim 10, wherein a data structure of nodes belonging to one of a same piconet and a same network, is recorded as a table, and routing is performed based on the table.

14. The communication method of claim 13, wherein the table is updated when one of a new node and a new network is found, and with a link being lost, deletes a corresponding node from the table.

15. The communication method of claim 13, wherein the table records at least one of a master node BD-ADDR, a slave node BD-ADDR, a connection lifetime, a piconet, and a network lifetime, and a BD-ADDR of a slave-slave joint node.

16. A method for routing formation of a source node, the method comprising the steps of:

- setting multiple paths towards a destination node by transmitting a route request message;
- receiving a route reply message through one of the set multiple paths from the destination node in receipt of the route request message, and using a most suitable route if the most suitable route is formed between the source node and the destination node through the one set path by a master-slave switching which switches a master node to a slave node; and
- confirming the one of the set multi-forward paths within a predetermined time period,
- wherein when the one of the set multi forward paths are not confirmed within the predetermined time period, links on unselected forward paths are parked,
- wherein the route request message is a routing trigger that initiates an Inquiry operation in the source node to find and connect neighboring nodes,
- wherein the Inquiry operation depends upon a generated random number.

17. A method for routing formation of a destination node, the method comprising the steps of:

- sending a route reply message through one of multiple paths set in accordance with a route request message sent out from a source node;
- using a most suitable route if the most suitable route is formed between the source node and the destination node through one of the set paths by a master-slave switching which switches a master node to a slave node; and
- confirming the one of the set paths within a predetermined time period,
- wherein when the one of the set paths are not confirmed within the predetermined time period, links on unselected forward paths are parked,
- wherein the route request message is a routing trigger that initiates an Inquiry operation in the source node to find and connect neighboring nodes,
- wherein the Inquiry operation depends upon a generated random number.

* * * * *